United States Patent [19]

Shieh

[11] Patent Number: 5,467,618

[45] Date of Patent: * Nov. 21, 1995

[54] MOTORCYCLE DISK BRAKE LOCK

[76] Inventor: Jin-Ren Shieh, No. 178, Shih Chia Rd., Taichung, Taiwan

[ * ] Notice: The portion of the term of this patent subsequent to Jan. 10, 2012, has been disclaimed.

[21] Appl. No.: 165,115

[22] Filed: Dec. 10, 1993

[51] Int. Cl.⁶ .................................................. B60R 25/00
[52] U.S. Cl. .................... 70/33; 70/227; 70/233
[58] Field of Search .................. 70/14, 18, 33, 70/38 A, 38 B, 38 C, 38 R, 53–56, 225, 226, 227, 228, 233, 237, 238, 464, 453–455; 188/265, 353; 303/89

[56] References Cited

U.S. PATENT DOCUMENTS

| 1,993,408 | 3/1935 | Ledin | 70/38 B |
|---|---|---|---|
| 2,104,981 | 1/1938 | Falk | 70/33 |
| 2,460,615 | 2/1949 | Andrew | 70/386 |
| 2,656,704 | 10/1953 | Mancuso | 70/33 X |
| 4,030,321 | 6/1977 | Kenyon | 70/34 |
| 4,183,235 | 1/1980 | Coralli et al. | 70/34 |
| 5,127,244 | 7/1992 | Myers | 70/34 X |
| 5,365,758 | 11/1994 | Shieh | 70/33 |
| 5,379,618 | 1/1995 | Shieh | 70/33 |

FOREIGN PATENT DOCUMENTS

| 85625 | 9/1921 | Australia | 70/33 |
|---|---|---|---|
| 353471 | 5/1922 | Germany | 70/33 |
| 1808343 | 8/1969 | Germany | 70/33 |
| 413238 | 4/1946 | Italy | 70/33 |
| 455873 | 3/1950 | Italy | 70/33 |

*Primary Examiner*—Peter M. Cuomo
*Assistant Examiner*—Suzanne L. Dino
*Attorney, Agent, or Firm*—Browdy and Neimark

[57] ABSTRACT

The lock body of a motorcycle disk brake lock has a first side, a second side adjacent to the first side, and an open slot of a predetermined depth and extending into the lock body, which is divided into a first portion and a second portion in which a locking device is disposed. The locking device is provided centrally with a locking bolt. When the locking device is in an unlocking state, the locking bolt is located at a first position. When the locking device is in a locking state, the locking bolt is located at a second position. The first portion is provided with an open end adjacent to the open slot and located in a locking hole coaxial with the locking bolt. The first portion is provided with at least one through hole having one end joining obliquely with the locking hole and having another end located in the side which is not adjacent to the open slot.

2 Claims, 2 Drawing Sheets

MOTORCYCLE DISK BRAKE LOCK

FIELD OF THE INVENTION

The present invention relates to an improved device for locking a motorcycle disk brake.

BACKGROUND OF THE INVENTION

The Taiwanese Patent Serial No. 81208343 discloses a lock for incapacitating the motorcycle disk brake. As shown in FIG. 1, the lock comprises a lock body 1 provided with a first portion 2 having a locking hole 3. Such a prior art lock as described above is defective in design in that the locking hole 3 can be clogged by dust deposited therein. The clogged locking hole 3 obstructs the entry of the locking bolt 4 into the locking hole 3.

SUMMARY OF THE INVENTION

It is, therefore, the primary objective of the present invention to provide an improved motorcycle disk brake lock, which overcomes the shortcoming of the motorcycle disk brake lock of the prior art described above.

DETAILED DESCRIPTION OF THE INVENTION

Figure 1:
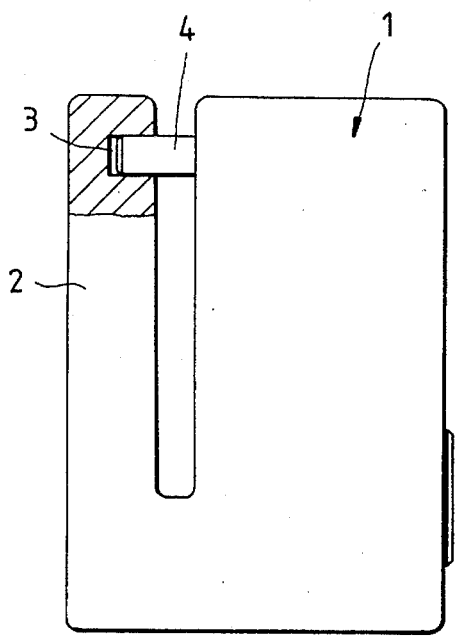
FIG. 1 shows a sectional view of a motorcycle disk brake lock of the prior art.
Figure 2:
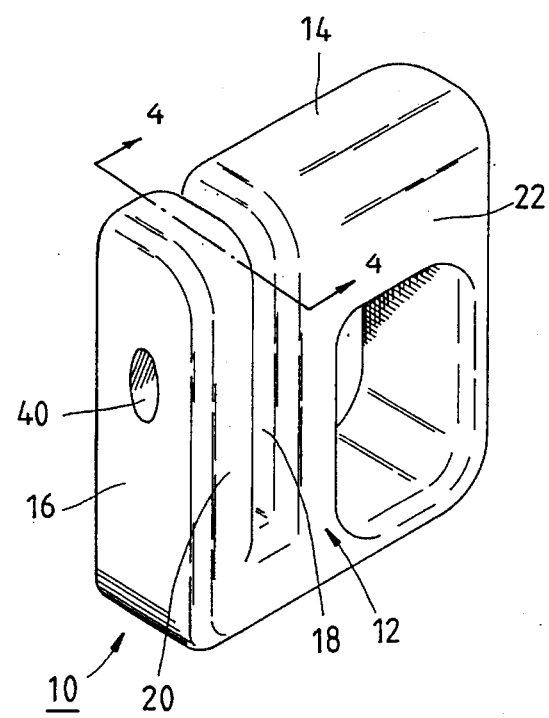
FIG. 2 shows a perspective view of a first preferred embodiment of the present invention.
Figure 3:
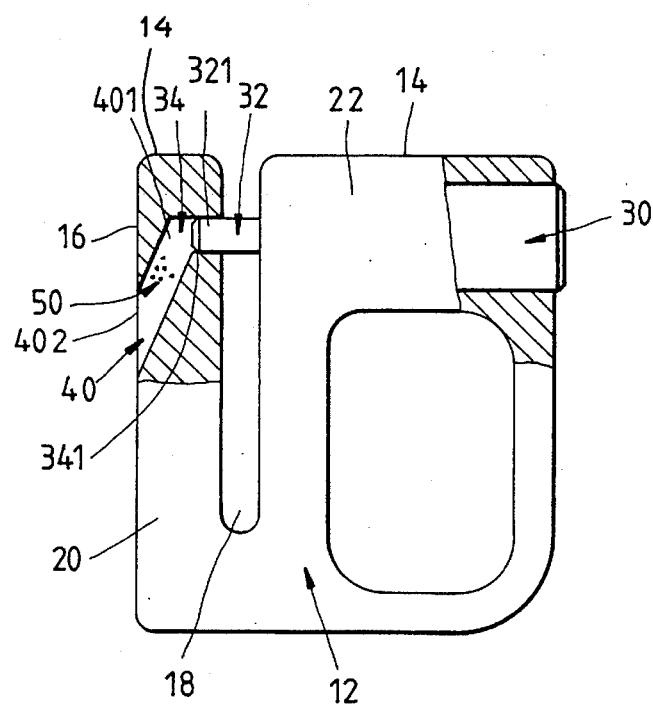
FIG. 3 shows a sectional view of a portion taken along the line 3—3 as shown in FIG. 2.

Referring to FIGS. 2 and 3, a motorcycle disk brake lock 10 of the first preferred embodiment of the present invention is shown to comprise a lock body 12 of substantially rectangular construction and having a first side 14, a second side 16 perpendicular to the first side 14, and an open slot 18 extending into the lock body 12 and perpendicular to the first side 14. The open slot 18 has a width and a depth, which are sufficient to accommodate a brake piece of the motorcycle disk brake. The lock body 12 is divided by the open slot 18 into a first portion 20 and a second portion 22 wider than the first portion 20.

A locking device 30 comprises centrally a locking bolt 32. In combination, the locking device 30 is mounted in the second portion 22 such that the locking bolt 32 is parallel to the first side 14. When the locking device 30 is in the unlocking state, the locking bolt 32 is located at a first position. When the locking bolt 32 is caused to move linearly from the first position to a second position so as to seal off the opening of the open slot 18, the locking device 30 is in the locking state. The mechanism by which the locking bolt 32 of the locking device 30 is caused to locate at the first position or the second position is beyond the scope of the present invention and will not be therefore described here.

The first portion 20 is provided with a locking hole 34 having an open end adjacent to the open slot 18 and coaxial with the locking bolt 32. The open slot 18 is sealed off by the locking bolt 32 which is located at the second position. In addition, the open end 321 of the locking bolt 32 is caused to enter the locking hole 34. The disk brake lock 10 of the present invention is characterized in that its first portion 20 is provided with a through hole 40 having an inner end 401 joining obliquely with an inner end 341 of the locking hole 34. In the meantime, the open end 402 of the through hole 40 is located in the second side 16. As a result, when the locking bolt 32 is inserted into the locking hole 34, the dust 50 is pushed out of the locking hole 34 via the through hole 40.

Figure 4:
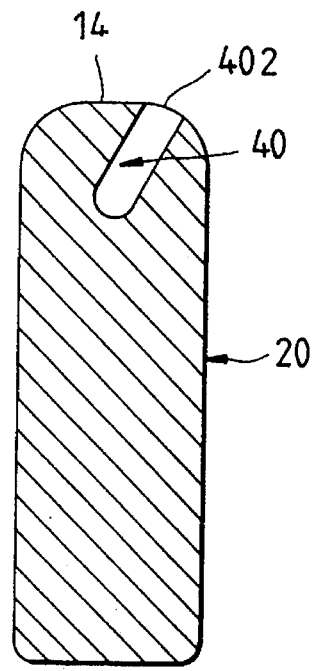
FIG. 4 shows a sectional view of a second preferred embodiment of the present invention and taken in the direction to the line 4—4 as shown in FIG. 2.
Figure 6:
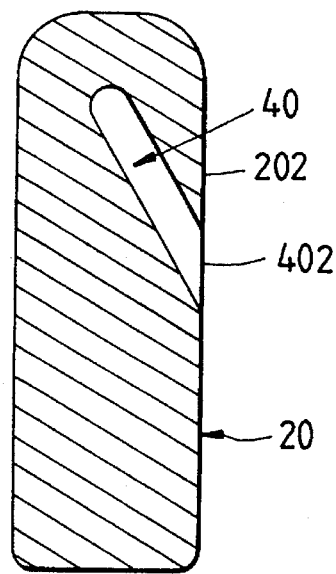
FIG. 6 shows a sectional view of a fourth preferred embodiment of the present invention and taken in the direction similar to that of FIG. 4.
Figure 5:
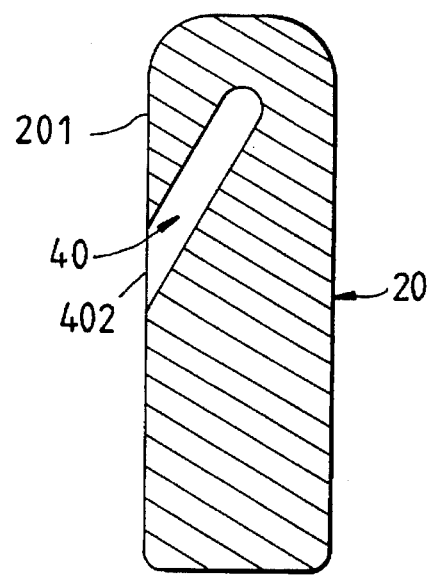
FIG. 5 shows a sectional view of a third preferred embodiment of the present invention and taken in the direction similar to that of FIG. 4.

As shown in FIGS. 4, 5 and 6 illustrating respectively the second preferred embodiment, the third preferred embodiment and the fourth preferred embodiment, the open end 402 of the through hole 40 may be located in the first side 14 of the first portion 20, or in two sides 201 and 202 which are perpendicular to the cross-sectional area of the locking hole 34.

What is claimed is:

1. An improved motorcycle disk brake lock comprising:

a lock body having a first side, a second side adjacent to said first side, and an open slot of a predetermined length and extending into said lock body such that said open slot is perpendicular to said first side, said lock body being divided by said open slot into a first portion and a second portion; and a locking means disposed in said second portion and having a locking bolt extending outwards from a center thereof, with said locking bolt being located at a first position at such time when said locking means is in an unlocking state, said locking bolt capable of being caused to move from said first position to a second position so as to seal off an open end of said open slot and to pass through one of a plurality of heat radiating holes of a motorcycle disk brake received in said open slot;

wherein said first portion of said lock body is provided with a locking hole having an open end adjacent to said open slot and coaxial with said locking bolt and said locking hole; and wherein said first portion of said lock body is provided with at least one through hole having one end joining obliquely with said locking hole and having another end that is located in a side other than a side of said open slot, wherein dust is pushed out of the locking hole by way of the through hole when said locking bolt is moved into said second position.

2. The improved motorcycle disk brake lock of claim 1 wherein said second portion is wider than said first portion.

* * * * *